United States Patent

Smith et al.

[11] 3,872,889
[45] Mar. 25, 1975

[54] ROTARY SELECTOR VALVE

[75] Inventors: William J. Smith, Bay Village;
Ernest Irti, Parma, both of Ohio

[73] Assignee: Teledyne, Inc., Cleveland, Ohio

[22] Filed: Jan. 7, 1974

[21] Appl. No.: 431,503

[52] U.S. Cl............................ 137/625.21, 251/175
[51] Int. Cl............................................. F16k 11/02
[58] Field of Search ... 137/625.21–625.25; 251/175, 251/288

[56] References Cited
UNITED STATES PATENTS 3,299,904   1/1967   Burke ............................ 251/288 X
3,547,155   12/1970  Ulbing ........................ 137/625.21

*Primary Examiner*—Henry T. Klinksiek
*Attorney, Agent, or Firm*—Watts, Hoffmann, Fisher & Heinke

[57] ABSTRACT

A multi-way, multi-position rotary disc valve having a single, spring loaded, plunger-type shear seal operative to communicate a pressure port with a system port in one position and to vent the system port in another position.

6 Claims, 12 Drawing Figures

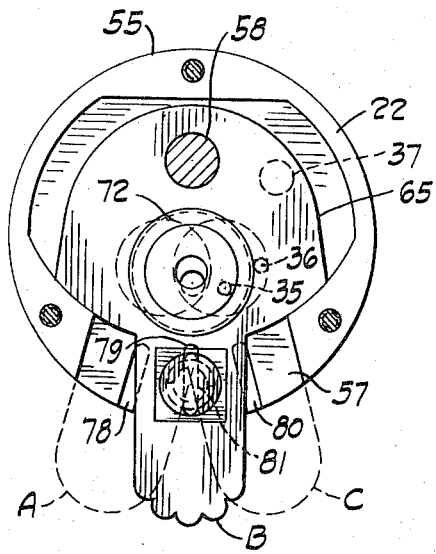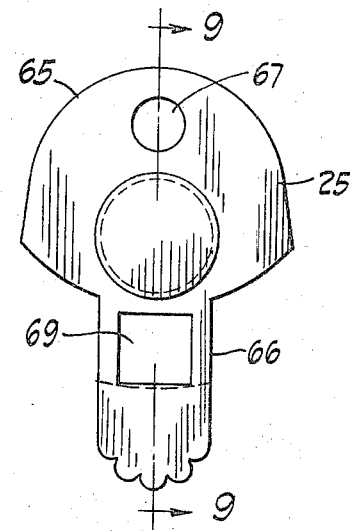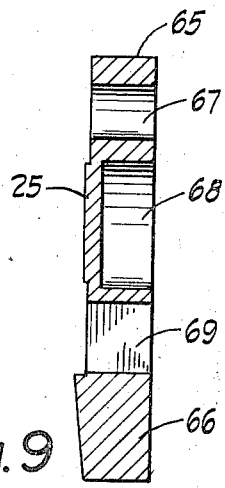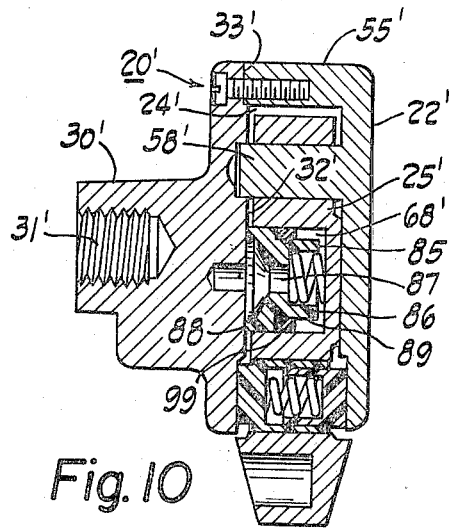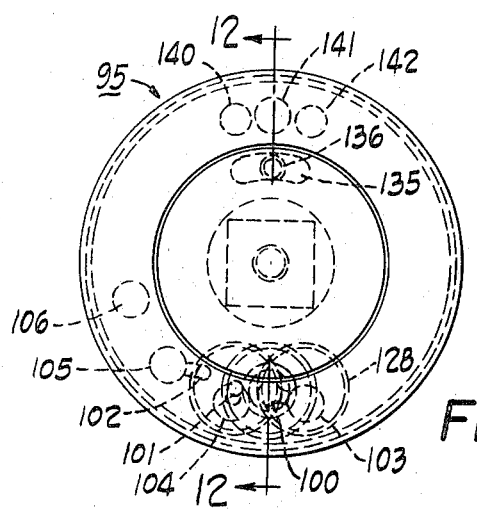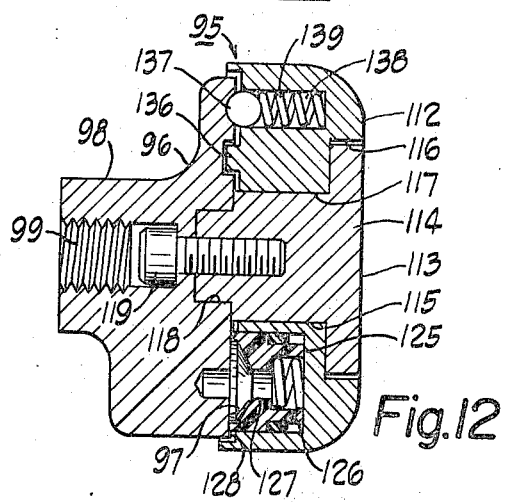

3,872,889

ROTARY SELECTOR VALVE

BACKGROUND OF THE INVENTION

This invention relates generally to valves, and more specifically to selector valves of a type employing a rotary disc valving member.

It has been conventional in the construction of directional control valves of various types, including selector valves, to employ a plurality of seals which, during movement of a valving member, selectively establish fluid communication among a plurality of ports. One type of seal used in such constructions is a spring loaded, plunger-type shear seal which comprises a tubular sleeve having an annular seal face in sliding engagement with a valving surface. The use of a multiple number of shear seals can make it difficult to avoid seal leakage or failure and in many instances necessitates complex valve designs which are expensive to manufacture. Another disadvantage of the prior art directional control valves employing a plurality of seals, especially plunger-type shear seals, is that the valving member can be difficult to actuate because of the fact that the several shear seals either bear against or are carried by it.

It has been proposed to construct a rotary disc selector valve with a single fluid sealing member in the form of a compressed O-ring which is carried by a rotary disc for engagement with a valving surface. Such a construction is disclosed in U.S. Pat. No. 3,297,052. In assemblying the valve, it is necessary to deform and engage the O-ring within a kidney-shaped recess of the rotary disc and to hold the O-ring in that position while compressing it between a cover plate and the valve body. The effectiveness of the seal requires a special valve insert which is fitted within the O-ring and is provided with a number of pressure equalization holes.

SUMMARY OF THE INVENTION

The present invention provides a new and improved multi-way, multi-position directional control valve, preferably a rotary disc selector valve, characterized by a single spring loaded, plunger-type shear seal and by a construction which simplifies manufacturing operations and yet is highly dependable in operation.

The spring loaded, plunger-type shear seal employed in the valve of this invention comprises a tubular sleeve which is carried by a rotatable member and has an annular seal face for selectively establishing fluid communication among a plurality of ports in a valving surface of a valve body. The rotatable member may be a lever structure pivotally mounted in a chamber formed between the valve body and a cover. In another form of the invention, the rotary member comprises a knob suitably connected to the valve body. The fluid ports extend through the valve body to openings adapted to be connected to pressure, system and exhaust lines.

The plunger-type shear seal which in part characterizes the valve of the present invention forms an effective, long-lived fluid seal. As distinguished from the prior art valve described above, the effectiveness of the seal does not depend upon maintaining an O-ring in a compressed condition on upon pressurizing the O-ring against the walls of a retaining recess. As further distinguished from the prior art, the new valve is easier to assemble and less expensive to manufacture.

Other advantages and a fuller understanding of the invention will be had from the following detailed description and the accompanying drawings.

BRIEF DESCRIPTION OF THE DRAWINGS

FIG. 7 is a view taken substantially on the line 7—7 of FIG. 2;

FIG. 8 is a plan view of the actuator employed in the valve shown in FIGS. 1 and 2;

FIG. 9 is a cross-sectional view taken on the line 9—9 of FIG. 8;

FIG. 10 is a cross-sectional view of another embodiment of the invention;

FIG. 11 is a plan view of still another embodiment of the invention; and

FIG. 12 is a cross-sectional view taken on the line 12—12 of FIG. 11.

DESCRIPTION OF THE PREFERRED EMBODIMENTS

Figure 1:
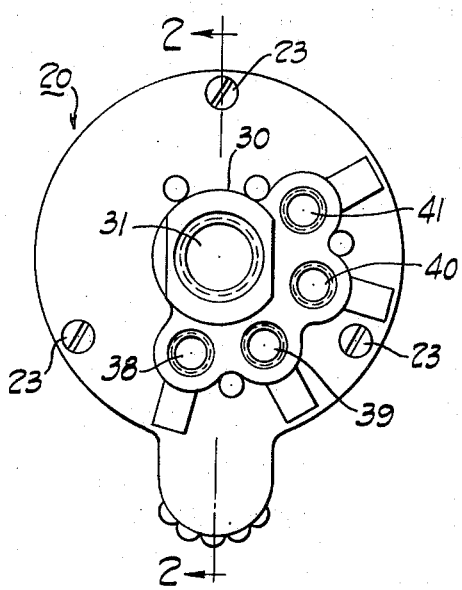
FIG. 1 is a plan view of an embodiment of the invention.
Figure 2:
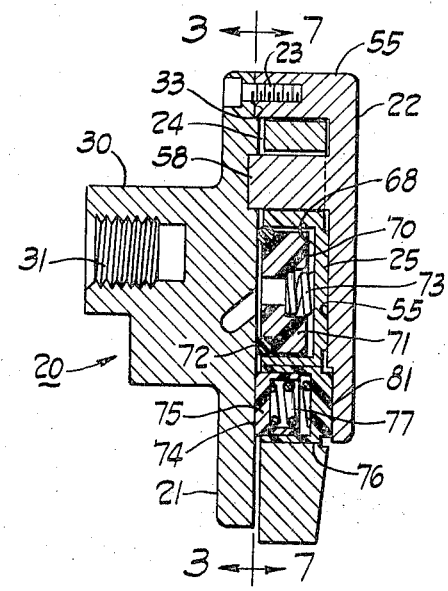
FIG. 2 is a cross-sectional view taken on the line 2—2 of FIG. 1.
Figure 3:
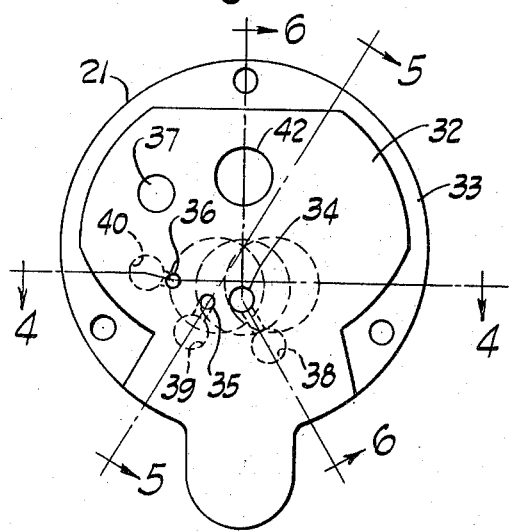
FIG. 3 is a plan view of the valve body taken substantially on the line 3—3 of FIG. 2.
Figure 4:
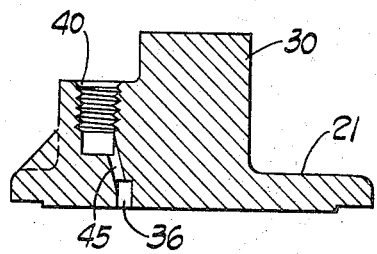
FIG. 4 is a cross-sectional view taken on the line 4—4 of FIG. 3.
Figure 5:
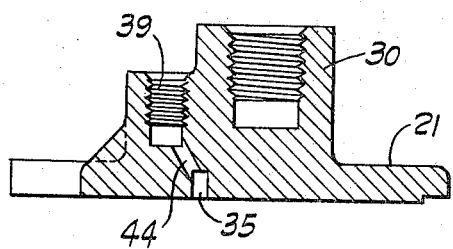
FIG. 5 is a cross-sectional view taken on the line 5—5 of FIg. 3.
Figure 6:
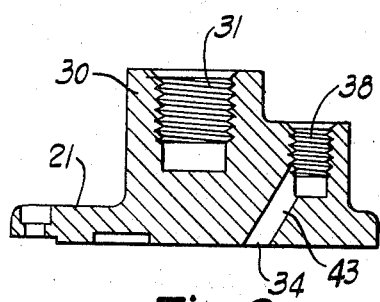
FIG. 6 is a cross-sectional view taken on the line 6—6 of FIG. 3.

Referring now to the drawings and to FIGS. 1 and 2 in particular, reference numeral 20 designates one embodiment of a four-way, three-position selector valve constructed in accordance with the present invention. The illustrated valve 20 is generally comprised of a body 21 and a cover 22. The body 21 and the cover 22 are connected together by screws 23 to define a valve chamber 24. An actuator member 25 is mounted for rotative movement in the chamber 24.

As is best shown in FIGS. 3–6, the valve body 21 includes an external hub-like portion 30 having a threaded hole 31 which may be used to mount the valve 20 in an operative position. The valve body 21 also has a flat face 32 which is partially bounded by a recessed edge portion 33. The flat face 32 functions as a valving surface and forms one wall of the valve chamber 24. A pressure or inlet port 34, system ports 35, 36 and an exhaust port 37 are formed in the valving surface 32. In the illustrated construction, the ports 34–36 are relatively closely spaced and are located in an arc extending partially about a blind hole or recess 42 which opens on the valving surface 32. The ports 34–36 are respectively connected to threaded openings 38–40 by passages 43–45 which extend at an angle through the valve body 21. The exhaust port 37 opens on the valving surface 32 at a location remote from the system port 36 and is connected to a threaded opening 41 by a passage extending straight through the valve body.

The valve cover 22 is best shown in FIGS. 2 and 7 as comprising a generally cup-shaped member having a rim 55 and an end wall 56 which cooperates with the valving surface 32 to define the valve chamber 24. An opening 57 is provided through the rim 55. The cover 22 also includes an integral spindle 58 which projects from the end wall 56. When the valve 20 is assembled as shown in FIG. 2, the rim 55 of the cover 22 is secured against the recessed edge 33 of the body 21 by the screws 23, and the end of the spindle 58 is received in the blind hole 42 formed in the valving surface 32.

Referring especially to FIGS. 8 and 9, the actuator 25 is shown in the form of a lever structure having a head 65 from which extends an operating handle 66. The head 65 is provided with a through hole 67 and a closed-end recess 68 which, when the actuator is mounted in position, opens on the valving surface 32 of the valve body 21. A square hole 69 is formed through the handle 66. The actuator 25 is rotatably mounted in the valve chamber 24 by the spindle 58 of the cover which extends through the hole 67. As shown in FIG. 7, the handle 66 extends through the opening 57 of the cover rim 55 so as to permit the actuator to be turned about the spindle 58.

A spring loaded, plunger-type shear seal 70 is carried by the actuator 25 for cooperation with the ports in the valving surface 32 of the valve body. The plunger seal 70 comprises a rigid tubular sleeve 71, preferably made of plastic, which is reciprocally mounted in the closed-end recess 68 of the actuator. In the embodiment of the invention shown in FIG. 2, the end of the sleeve 71 projecting from the recess 68 carries an O-ring 72 which may be made of a plastic type material, for example, polyurethane or the like. The O-ring 72 defines an annular seal face which is of reduced cross-sectional area relative to the cross-sectional wall area of the sleeve 71. The shear seal 70 is pre-loaded by a spring 73 to force the O-ring 72 against the valving surface 32 of the valve body. When the valve 20 is in use, the shear seal 70 is urged against the valving surface 32 by the combined action of the fluid pressure in the recess 68 acting on the end of the sleeve 71 and the force of the spring 73. The annular seal face defined by the O-ring 72 permits fluid from the sleeve to exert a thrust on its projecting end which partially balances the oppositely acting pressure on the end of the sleeve 71 in the recess 68. The illustrated construction of the plunger-type shear seal 70 therefore obtains a differential piston effect wherein the seal exerts a force on the valving surface 32 which is equal to the pressure of the fluid on the seal times the area of the annular seal face defined by the O-ring 72. This differential piston effect reduces the tendency of the seal to lock against the valving surface 32 due to excessive pressures, whereby the actuator 25 can be easily moved. In addition, the effect of friction between the shear seal 70 and the valving surface 32 is minimized by the use of the O-ring 72.

In the form of the invention illustrated in FIGS. 1-9, the actuator 25 is movable to three positions for the purpose of selectively communicating the ports 34-37, and a plunger-detent assembly, indicated generally by reference numeral 74, is provided to operatively locate the actuator in a selected position. The plunger detent assembly comprises a pair of hollow plastic plungers 75, 76 which are telescoped one within another and positioned within the hole 69 of the actuator handle. A spring 77 carried within the telescoped plungers 75, 76 biases the plungers away from each other into respective engagement with the valving surface 32 and the cover end wall 56. As shown in FIG. 7, the cover end wall 56 is formed with three notches 78-80, which serve to define the operative positions of the actuator. The head of the plunger 76 is formed with a projecting rib 81 which is shaped to fit in each of the notches 78-80. When the actuator is moved to any one of its three positions, the spring 77 serves to force the rib 81 of the plunger 76 into one of the notches 78-80 to hold the actuator in that position. The force of the spring 77 is overcome by exerting an added force on the actuator handle 66 which causes the rib 81 to be cammed out of the notch and the plungers 75, 76 to retract until another of the operative positions is reached.

Still referring to FIG. 7, the actuator 25 is shown in an operative position B in which the inlet port 34 and the system port 35 are circumscribed by the annular seal face defined by the plunger seal O-ring 72, thereby connecting the system port 35 to pressure. In this position of the actuator 25, the second system port 36 is isolated from the inlet port 34 and is connected to the exhaust port 37 through the valve chamber 24. When the actuator 25 is moved to the left as shown in FIG. 7 to the broken line position indicated by reference character A, the O-ring seal 72 of the seal 70 circumscribes the inlet port 34 and both system ports 35, 36, whereby both system ports are connected to pressure. When the actuator 25 is moved to the right as viewed in FIG. 7 to the broken line position C, the inlet port 34 is isolated from both system ports 35, 36 by the O-ring seal 72, whereby the system ports are vented to the exhaust port 37 through the valve chamber 24.

An alternative embodiment 20' of the valve is shown in FIG. 10 where parts corresponding to the previously described embodiment 20 are designated by the same reference numerals with a prime. The principal difference between the embodiment 20' and the embodiment of FIGS. 1-9 resides in the form of the spring loaded, plunger-type shear seal 85. The seal 85 is shown to comprise a rigid tubular sleeve 86, preferably made of a plastic material, having a through passage 87 and a rim 88 around one end. The rim 88 functions in the same manner as the O-ring 72 of the embodiment 20 to form an annular seal face which is of reduced cross-sectional area relative to the cross-sectional wall area of the sleeve 86. The shear seal rim 88 engages the valving surface 32' so that the inlet port of the valve is communicated with one system port in one operative position of the actuator 25' and to both system ports in another operative position of the actuator, and so that both system ports are vented to the exhaust port in a third position of the actuator. As further shown in FIG. 10, the sleeve 86 has a reduced diameter portion 89, and an O-ring 90 is positioned around the reduced diameter portion in engagement with the walls of the recess 68'.

Another preferred embodiment 95 of a valve constructed in accordance with the present invention is illustrated in FIGS. 11 and 12. The illustrated valve 95 is comprised of a body member 96 which is similar to the valve body 11 described above in connection with FIGS. 3-6. The valve body 96 includes a flat valving surface 97 and an external hub-like portion 98 having a threaded valve-mounting hole 99. An inlet port 100 and two system ports 101, 102 are formed in the valving surface 97. These ports 100-102 are respectively connected to threaded holes 103-105 by passages extending through the valve body. As shown in FIG. 11, the ports 100-102 are relatively closely spaced in an arc near the outer edge of the valving surface 97. An exhaust port 106 is also formed in the valving surface 97 and extends through the valve body to a threaded opening.

A knob 112 is connected to the valve body 96 for rotary movement. The knob 112 is mounted by a member 113 having a base 114 and a stem 115 projecting from the base. The base 114 fits in a recess 116 formed in the knob 112 and the stem 115 projects through an axial hole 117 in the knob. The distal end of the stem 115 is in the form of a square shoulder which is received in a correspondingly shaped recess 118 formed in the surface 97 of the valve body. The valve body 96 and the mounting member 113 are secured together by a screw 119.

The rotary knob 112 carries a spring loaded, plunger-type shear seal 125 which is similar to the seal described in connection with the embodiment of FIG. 10. The seal 125 is comprised of a tubular sleeve 126, preferably made of plastic, having a through passage 127 and a rim 128 at one end. The rim 128 defines an annular seal face which slidably engages the valving surface 97 and functions to establish selective communication between the inlet, system and exhaust ports.

The extent of permitted relative rotary movement between the valve body 96 and a knob 112 is determined by means of a cooperating slot and projection arrangement. In the illustrated embodiment of the invention, an arcuate recess 135 is formed in the valve body surface 97 and a cylindrical projection 136 extends from the adjacent face from the knob 112 into the recess. A detent arrangement is also interposed between the structures 86, 112 to locate the operative positions of the valve. This detent structure comprises a ball 137 which is carried in a hole 138 of the knob 112 and is biased into engagement with the valve body 96 by a coil spring 139. A series of recesses 140–142 are formed in the valving surface 97 to define the three operative positions of the valve.

It will be seen that the valve 95 is a four-way, three-position valve which operates in a manner similar to the embodiments described in connection with FIGS. 1–10. In one rotative position of the knob 112, the inlet port 100 and one system port 101 are circumscribed by the annular seal face 128 of the seal 125, whereby the system port is connected to pressure. In another operative position, the inlet port 100 and both system ports 101, 102 are circumscribed by the annular seal face 128, whereby both system ports are connected to pressure. In the third position of the valve, the inlet port 101 is isolated by the annular seal face 128, while the system ports 101, 102 are vented to the exhaust port 106.

While the embodiments of the invention have been shown and described as four-way, three-position valves, it will be understood that one system port and one actuator position can be eliminated to provide a three-way, two-position valve construction. Many other modifications and variations of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. A rotary selector valve comprising:
   a. structure defining a valve body having:
      i. a valving surface,
      ii. pressure, system and exhaust ports in said valving surface,
   b. a single, pre-loaded, plunger-type shear seal including a rigid tubular member having means at one end defining an annular seal face, and
   c. actuator means connected to said valve body for relative rotative movement and carrying said tubular member so that said annular seal face is in fluid-sealing, sliding engagement with said valving surface,
   d. said actuator means and valve body being relative rotatable between one position in which said system and exhaust ports are in communication and at least one other position in which said pressure port and at least one system port are in communication.

2. A valve as claimed in claim 1 wherein said means defining said annular seal face comprises an O-ring carried by said tubular member.

3. A valve as claimed in claim 1 wherein said means defining said annular seal face comprises a rim on said one end of said tubular member.

4. A rotary selector valve comprising:
   a. a valve body member including a valving surface and pressure, system and exhaust ports in said surface,
   b. a cover member connected to said valve body member to define a valve chamber,
   c. one of said members including a spindle in said chamber projecting toward the other of said members,
   d. an actuator having a portion disposed in said chamber and mounted for rotary movement by said spindle,
   e. said actuator portion having a closed-end recess opening onto said valving surface,
   f. a single plunger-type shear seal carried by said actuator and including a tubular sleeve reciprocally disposed in said recess and having an annular seal face in fluid sealing, sliding engagement with said valving surface,
   g. said shear seal being carried by said actuator for movement to selected positions in which:
      i. said pressure port is communicated to a system port in one position,
      ii. a system port is isolated from said pressure port and is communicated to said exhaust port in another position,
   h. and means for releasably holding said actuator in each of said positions.

5. A rotary selector valve comprising:
   a. a valve body member including a valving surface and a pressure port, at least two system ports and an exhaust port in said surface,
   b. a cover member connected to said valve body member to define a valve chamber,
   c. one of said members including as an integral part thereof a spindle in said chamber extending toward and engaged in the other of said members,
   d. an actuator including a head mounted on said spindle for rotary movement in said chamber and a handle projecting outwardly from said chamber,
   e. said actuator having a closed-end recess opening onto said valving surface,
   f. a single, pre-loaded, plunger-type shear seal carried by said actuator and including a tubular sleeve reciprocally disposed in said recess and having an annular seal face in fluid sealing, sliding engagement with said valving surface, g. said plunger shear seal being carried by said actuator movement to selected positions in which:
  i. said pressure port is communicated to a system port in one position,
  ii. said pressure port is communicated to a plurality of system ports in a second position,
  iii. said pressure port is isolated from the other ports in a third position,
h. and means including detent means carried by said actuator for releasably holding said actuator in each of said positions, said shear seal being located between said spindle and said detent means.

6. A rotary selector valve comprising:
a. a valve body member,
b. a knob member rotatably connected to said valve body member,
c. one of said members having a valving surface and pressure, system and exhaust ports in said surface,
d. the other of said members having a closed end recess opening onto said valving surface,
e. a single, pre-loaded, plunger-type shear seal including a tubular sleeve having means forming an annular seal face at one end,
f. said sleeve being reciprocally disposed in said recess with said annular seal face in sliding engagement with said valving surface,
g. said knob member being rotatable to a plurality of positions in which:
  i. said pressure port is communicated to a system port in one position,
  ii. a system port is isolated from said pressure port and is communicated to said exhaust port in another position.

* * * * *